(12) United States Patent
Doerr et al.

(10) Patent No.: US 6,259,833 B1
(45) Date of Patent: Jul. 10, 2001

(54) OPTICAL CROSS CONNECT USING A PLANAR ARRANGEMENT OF BEAM STEERERS

(75) Inventors: Christopher R. Doerr, Middletown; Corrado P. Dragone, Little Silver, both of NJ (US)

(73) Assignee: Lucent Technologies Inc.

( * ) Notice: Subject to any disclaimer, the term of this patent is extended or adjusted under 35 U.S.C. 154(b) by 0 days.

(21) Appl. No.: 09/232,099

(22) Filed: Jan. 15, 1999

(51) Int. Cl.[7] .......................................... G02B 6/26
(52) U.S. Cl. .................... 385/17; 385/46; 385/4; 359/117
(58) Field of Search .................... 385/46, 16, 17, 385/22, 14, 27, 39, 50, 4, 8, 9, 37; 359/117, 128, 139

(56) References Cited

U.S. PATENT DOCUMENTS 3,990,780 * 11/1976 Dakss ........................................ 385/17
4,725,844 * 2/1988 Goodwin et al. ....................... 342/374
5,440,654 * 8/1995 Lambert, Jr. ............................. 385/17
5,966,476 * 10/1999 Hwang et al. ............................. 385/3

FOREIGN PATENT DOCUMENTS 5-273606A * 10/1993 (JP).
6-208144A * 7/1994 (JP).

\* cited by examiner

Primary Examiner—Rodney Bovernick
Assistant Examiner—Michael J Stahl
(74) Attorney, Agent, or Firm—Baker & McKenzie (57) ABSTRACT

A strict-sense nonblocking N×N spatial optical cross connect that employs planar lightwave beam steerers. The beam steerers allow for a modular design without requiring two-dimensional chip-to-chip waveguide interconnections. The modular design and the fact that the number of electrical control leads scales as NlogN in turn allows the possibility of constructing large, robust, solid-state cross connects. A cascaded beam-steerer design that substantially relaxes phase shifter strength requirements is also described.

8 Claims, 8 Drawing Sheets

OPTICAL CROSS CONNECT USING A PLANAR ARRANGEMENT OF BEAM STEERERS

FIELD OF THE INVENTION

The present invention relates to optical cross connects and beam steerers.

BACKGROUND OF THE INVENTION

Network nodes often require strict or wide-sense non-blocking N×N cross connects. A nonblocking cross connect can connect any of N ports on one side of the cross connect to any of N ports on the other side of the cross connect in any of the N! possible connection setups. A strict or wide-sense nonblocking cross connect can change a pair of connections without interrupting any of the other connections. (See R. Ramaswami et al., "Optical Networks: A Practical Perspective," Morgan Kaufmann Publishers, San Francisco, 1998.) Furthermore, performing the switching optically allows for very large connection bandwidths.

One approach to making an optical cross connect is to use bulk optics with moving parts. Strict-sense nonblocking micro and macro-mechanical space switches with N as large as 8 and 72, respectively, have been reported. (See, e.g., L. Y. Lin et al., "High-Density Connection-Symmetric Free-Space Micromachined Polygon Optical Crossconnects With Low Loss for WDM Networks," Optical Fiber Comm. Conf., paper PD24-1, 1998; and the Astarte company web site at http://www.starswitch.com/7250spec.htm.)

Another approach is to use planar lightwave circuits, which can be completely solid-state. Strict-sense nonblocking space switches in AlGaAs, InGaAsP, LiNbO$_3$, and silica with N as large as 8, 4, 8 (16 using multiple chips), and 16 (actually only wide-sense nonblocking), respectively, have been demonstrated. (See, e.g., T. Goh et al., "Low-loss and high-extinction-ratio silica-based strictly nonblocking 16×16 thermooptic matrix switch," IEEE Photon. Technol. Lett., vol. 10, pp. 810–812, 1998.)

The planar approaches have used either arrangements of 1×2 or 2×2 switches or a broadcast-and-select architecture. (See M. Gustavsson et al., "Monolithically integrated 4×4 InGaAsP/InP laser amplifier gate switch arrays," Electron. Lett., vol. 28, pp. 2223–2225, 1992.) Although such arrangements can have very low crosstalk, they have several drawbacks in terms of scaleability. First, in such arrangements, the number of switches and/or gates is $\geq N^2$, consuming nearly an entire wafer for N=16. (See, e.g., Goh et al.) Second, the electrical-lead-number and settings number is $\geq N^2$. Third, there are often many waveguide crossings.

SUMMARY OF THE INVENTION

The present invention provides a planar lightwave circuit strict-sense nonblocking cross connect that has an electrical-lead-number proportional to NlogN and settings number proportional to $N^{(1+1/\log N)}$logN; has no waveguide crossings, which permits a compact size; and is modular. It is thus suitable for very large-N, maintainable cross connects. Additionally, the present invention does not rely on gain or loss elements and so can be made with virtually any lightwave circuit material.

In a further exemplary embodiment of a cross connect in accordance with the present invention, a tilted glass block is used to provide a large free-space length for switching large numbers of ports.

The present invention also provides a novel beam steerer comprising two or more cascaded stages. The multi-stage beam steerer of the present invention can cover a large steering angle with a limited available controllable phase shift.

DETAILED DESCRIPTION

Figure 1:
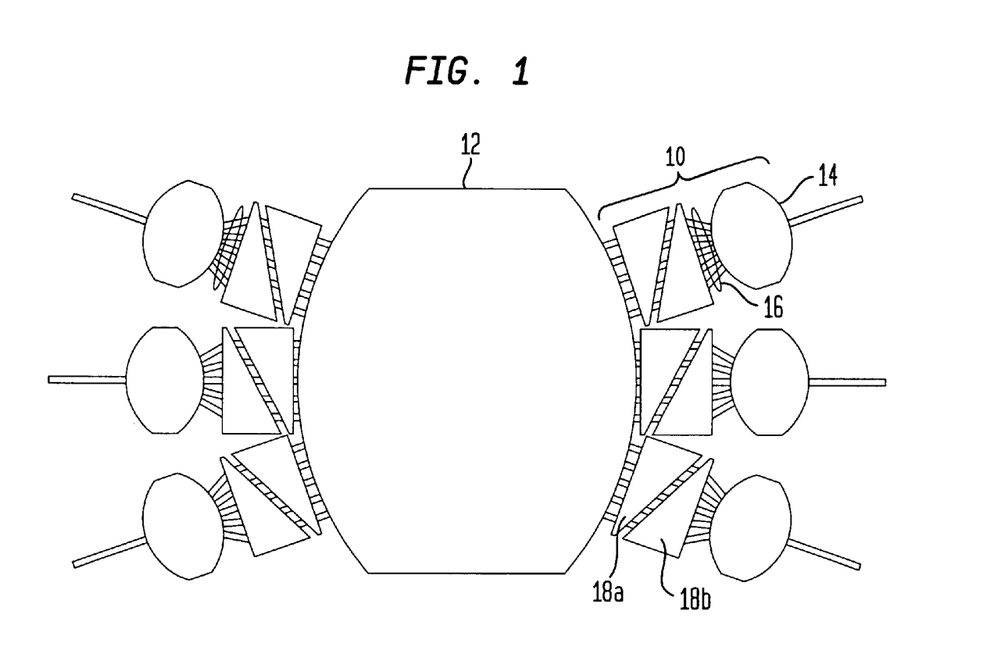
FIG. 1 shows an exemplary embodiment of an optical cross connect in accordance with the present invention.

An exemplary embodiment of a planar optical cross connect in accordance with the present invention is shown in FIG. 1. The exemplary cross connect of FIG. 1 comprises two facing arrays of planar beam steerers 10 and a central star coupler 12. Each beam steerer 10 includes a star coupler 14 which is coupled to the central star coupler 12 by an array of waveguides 16 of substantially equal length. The waveguides 16 of the beam steerers 10 are arranged as in a conventional star coupler. (See, C. Dragone, "Efficient N×N star couplers using Fourier optics," J. Lightwave Technol., vol. 7, pp. 479–489, 1989.)

The planar cross connect of the present invention is implemented on a planar substrate, such as InP (indium phosphide). The various optical features such as the waveguides and star-couplers are formed as areas of a higher index of refraction than the surrounding material. Such features can be formed by selectively doping the substrate, in the desired pattern, with materials such as indium or galium-arsenide. Various known fabrication techniques and materials can be used.

Each beam steerer 10 includes dynamic phase shifters 18a, 18b arranged on the waveguides 16. The phase shifters, under the control of externally applied signals, alter the index of refraction of the waveguides 16, thereby changing the phase of an optical beam therethrough. By changing the phase linearly across the waveguides 16 via the dynamic phase shifters 18a, 18b, the beam emanating from a beam steerer 10 can be steered. A connection is made by aiming beam steerers 10 on the left and right sides of the cross connect at each other. Since the beam steerers operate independently, this switch is strict-sense nonblocking.

The phase shifters can be fabricated in a known way, such as described in C. R. Doerr et al., "Wavelength-division multiplexing cross connect in InP," IEEE Photon. Technol. Lett., vol. 10, pp. 117–119, 1998. Possible implementations include forward- or reverse-biased p-n junctions in InP and heated regions in silica.

In the exemplary embodiment of FIG. 1, two triangular phase shifters 18a and 18b are used in each beam steerer 10 to achieve the linear phase change across the waveguides 16. One of the triangular phase shifters is used for steering the beam in one direction and the other for steering the beam in the other direction. It should also be noted that each beam steerer 10 can be implemented with only one phase shifter. In that case, however, the one phase shifter would have to be capable of generating a larger phase difference between adjacent waveguides than would one of a pair of phase shifters. Moreover, with one phase shifter, the default steering direction would be set at one extreme of the desired steering range, assuming the phase shifter deflected the beam in only one direction.

In the exemplary embodiment of FIG. 1, each of the phase shifters 18a and 18b is formed in the shape of a triangle which spans an array of waveguides 16 for each beam steerer. Because each phase shifter pair controls multiple waveguides, as opposed to only one waveguide, the number of electrical leads that are required to couple the phase shifters to the control circuitry (not shown) is significantly reduced.

While phase shifters such as those of FIG. 1 which span the entire array of waveguides 16 of each beam steerer 10 reduce the number of electrical traces required, in order to steer the full range, the phase shifters should be capable of controlling the phase difference between adjacent waveguides to change from $-\pi$ to $\pi$. For M waveguides in the beam steerer, the phase shift in the outermost waveguides should thus be controllable from 0 to approximately $(M-1)\pi$. For large M (often required for large N) this may not be feasible.

One solution to reduce the required phase-shifting strength is to divide the waveguide arrays into smaller arrays, each with an associated independently controllable triangular phase shifter (or, in the limit, control each waveguide independently). Unfortunately, the gaps between controls required for isolation will increase the center-to-center spacing between adjacent beam steerers. This will greatly increase the device size, since a linear increase in beam-steerer spacing results in a quadratic increase in the radius of the central star-coupler. Also, it can be difficult to have isolated controls within the waveguide array without creating phase distortions.

Figure 2:
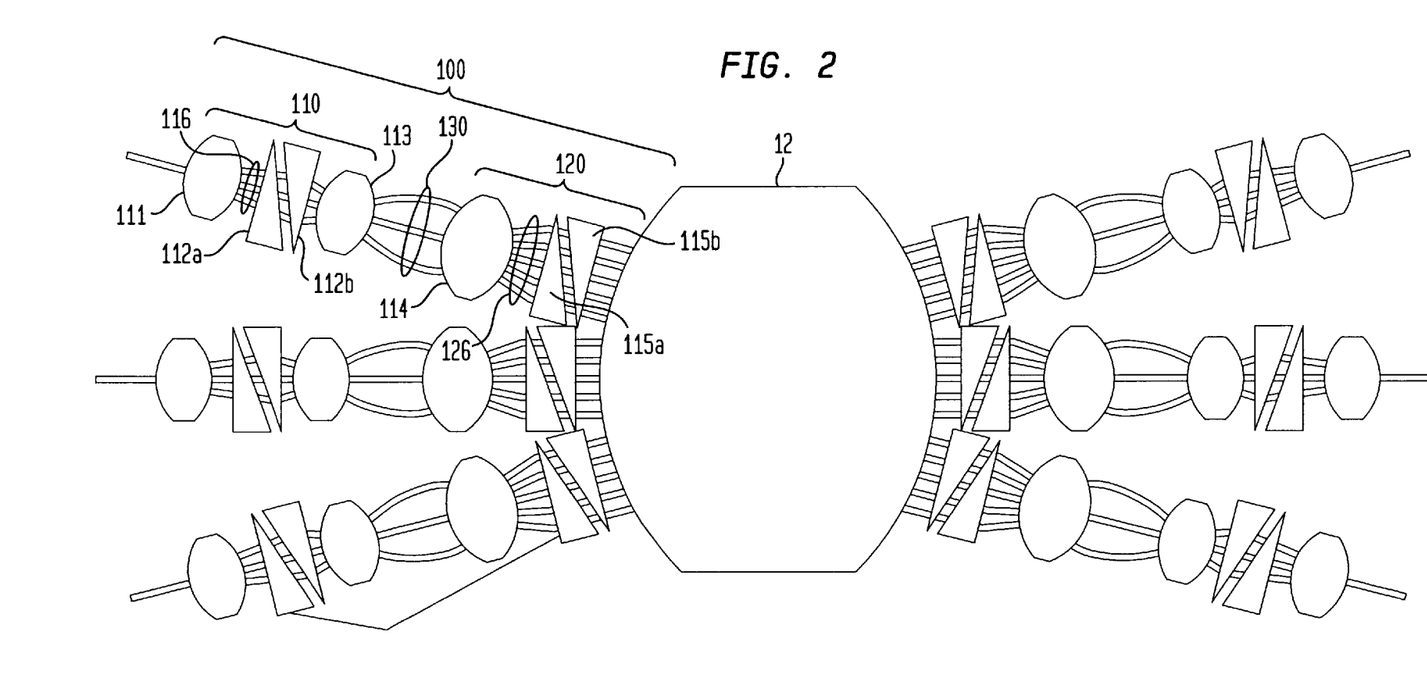
FIG. 2 shows an exemplary embodiment of a 3×3 optical cross connect comprising two-stage, cascaded beam steerers in accordance with the present invention.

FIG. 2 shows an exemplary embodiment of a cross connect with beam steerers 100 which overcome the aforementioned limitations. Each beam steerer 100 of FIG. 2 comprises a first stage 110 and a second stage 120 which are cascaded. The first and second stages perform coarse and fine steering, respectively. The two-stage beam steerers 100 of FIG. 2 can be used in place of the single-stage beam steerers of FIG. 1, however, the beam steerers 100 can cover a larger steering angle with a limited available controllable phase shift.

As in the case of the single-stage beam steerer, the required phase shift across the array of $M_1$ waveguides of the first stage 110 is approximately $(M_1-1)\pi$. For the second stage 120, however, which performs fine steering about the coarser, $N_1$ beam steering angles steered by the first stage, the required phase shift across the array of $M_2$ waveguides is approximately only $[(M_2-1)/N_1]\pi$. In general, for a stage i in a multi-stage beam steerer, the required phase shift to steer across all ports is more specifically:

$$\frac{(M_i-1)(N_i-1)\Pi}{\prod_{j=1}^{i} N_j}$$

The exemplary, two-stage cascaded beam steerer 100 of FIG. 2 comprises a first star-coupler 111, a first pair of phase shifters 112a, 112b, a second star-coupler 113, a third star-coupler 114 and a second pair of phase shifters, 115a, 115b. As in the single stage beam steerer of FIG. 1, each stage 110 and 120 comprises an array of waveguides 116 and 126, respectively. The two stages 110 and 120 are coupled by an array of connecting waveguides 130 between the star-couplers 113 and 114.

The first stage 110, which can be thought of as performing coarse steering, can steer the input lightwave into a choice of relatively coarsely spaced connecting waveguides 130, which by virtue of their coarse angular spacing give coarse steering in the central star coupler 12. The second stage 120 then performs fine steering about the coarsely-steered angles; i.e., the fine steerer 120 can steer the beams by small angles about the coarse-steered angles. Thus, if the first beam steerer stage 110 can steer the input to one of $N_1$ connecting waveguides 130 and the second beam steerer stage 120 can steer a range of $N_2$ receiving (or transmitting) beam steerers, the cascaded combination can steer over a range of up to $N_1 N_2$ receiving (or transmitting) beam steerers.

Although the exemplary cascaded beam steerer 100 shown in FIG. 2 comprises two stages, larger numbers of stages can be cascaded as needed. If each stage has the same steering range Ns, then for a N×N cross connect, each beam steerer would comprise $\log_{Ns} N$ stages. This logarithmic dependence on N allows for large practical cross connects.

The cascaded beam steerers of the present invention can also be used in applications other than cross connects, such as laser printers, optical disk readers, etc.

Figure 3A:
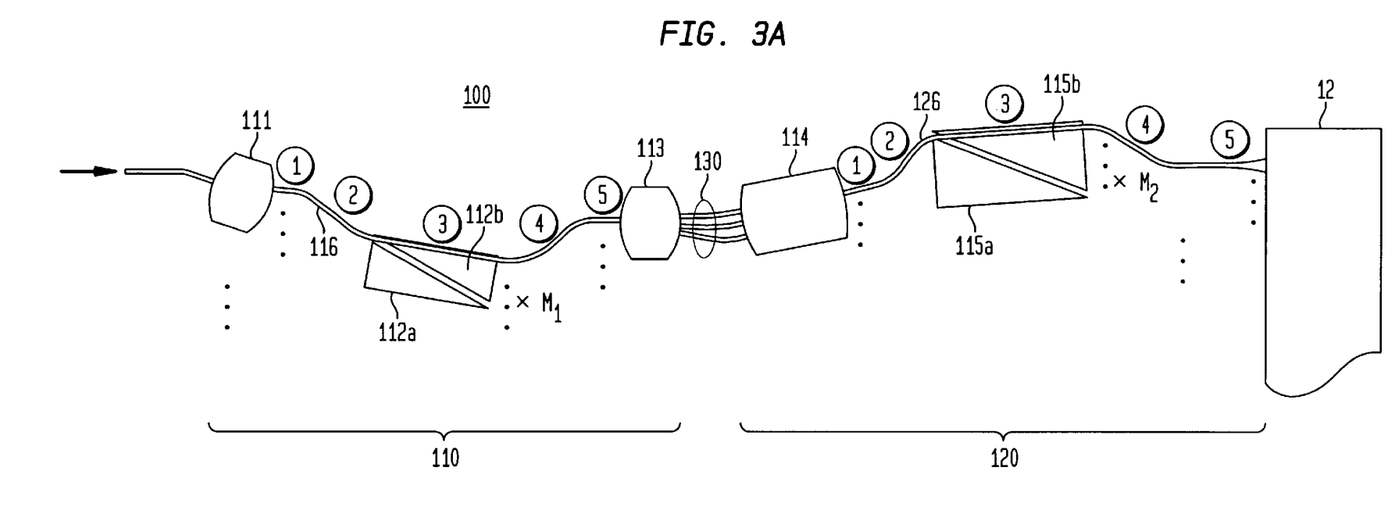
FIGS. 3A and 3B show an exemplary waveguide layout for a cross connect with two-stage beam steerers in accordance with the present invention.

To minimize the sensitivity of the cross connect to wavelength, all of the waveguides in the beam steerer should have the same effective length. In an exemplary embodiment of the present invention, this is achieved by constructing each waveguide path with five straight segments and four bends of equal bend radius. FIG. 3A shows a partial schematic representation of an exemplary cascaded beam steerer 100 in an exemplary cross connect. In FIG. 3A, only one waveguide is shown for each stage 110 and 120 for clarity.

In the exemplary embodiment of FIG. 3A, each stage 110, 120, steers among three settings (i.e., Ns=3). Such a cascaded beam steerer 100 would thus be used, for example, as one of nine beam steerers on one side of a 9×9 cross connect. The first stage 110 comprises an array of five equal-length waveguides 116 connected to the star couplers 111 and 113 whereas the second stage 120 comprises an array of 12 equal-length waveguides 126 connected to the star coupler 114 and the central star coupler 12 of the cross connect. The two stages are connected to each other by three waveguides 130. The coarse steering stage 110 steers the input to one of the three waveguides 130, and the fine steering stage 120 steers the beam in the central star coupler 12 a small amount about the angle determined by each of the input waveguides 130. As in the embodiments of FIGS. 1 and 2, the phase shifters 112a, 112b and 115a, 115b, which perform the beam steering, comprise triangular regions of p-n junctions over the waveguides.

As shown in FIG. 3A, each waveguide 116, 126 in each stage 110, 120 comprises five straight sections and four curved sections, all of the same bend radius. The five straight sections in each stage are labeled 1–5 (encircled). The total lengths of the straight sections are the same for all waveguides in each stage. Likewise, the total lengths of the curved sections are the same for all waveguides in each stage. As a result, phase errors in the beam steerers due to overall waveguide length variations are avoided.

If the angles (with respect to some fixed reference line such as the axis of the central star coupler) of the five straight sections of waveguide m (where m=1 through M) are $\alpha_1(m)$ through $\alpha_5(m)$, in order of connection, then the above-discussed goal is achieved by making $$\alpha_2(m)=[\alpha_1(m)+\alpha_3(m)]/2+c_1$$

and $$\alpha_4(m)=[\alpha_3(m)+\alpha_5(m)]/2+c_2,$$

where $c_1$ and $c_2$ are chosen constants. A description of the foregoing can be found in U.S. patent application Ser. No. 09/232,109, filed on even date herewith, entitled OPTICAL DEVICE HAVING EQUAL LENGTH WAVEGUIDE PATHS, and incorporated herein by reference in its entirety.

Figure 3B:
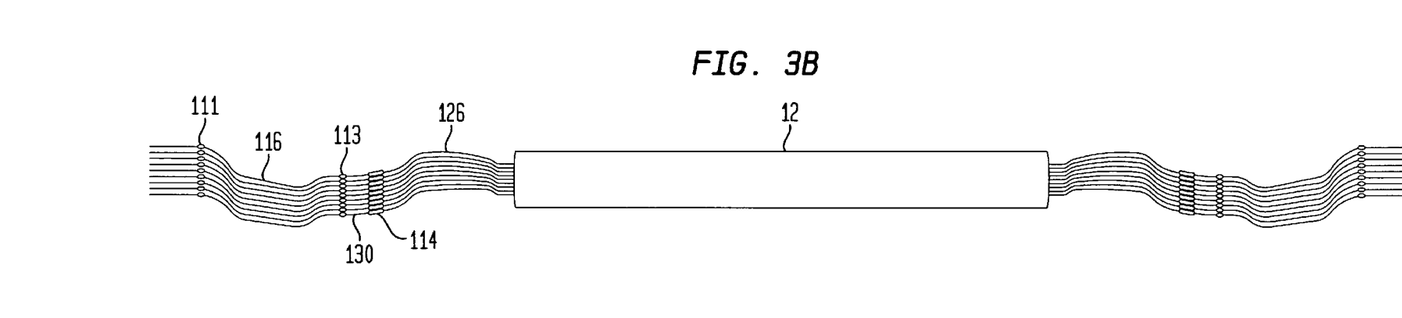

FIG. 3B shows the actual waveguide layout of an exemplary 9×9 cross connect implemented in InP using two-stage beam splitters with two cascaded stages of Ns=3 laid out in the above-discussed manner. The size of the exemplary device shown in FIG. 3B is approximately 2.2 mm×34.4 mm, with approximately half of the length being occupied by a 14.5 mm long central free-space region for the central star coupler 12.

For clarity, the phase shifters are not shown in FIG. 3B, but would be arranged as shown in FIG. 3A. In the exemplary embodiment shown, triangular phase shifters can be used, with the triangle bases and heights for the first (coarse) and second (fine) beam steering stages being 1.2×0.054 mm and 1.2×0.081 mm, respectively.

In an exemplary embodiment of a cross connect constructed in accordance with the present invention, the forward and reverse break voltages of the phase-shifter triangles are +0.9V and −30V, respectively. With no electrical signal applied, each steerer is centered, and thus each port is pointed at the center port (e.g., port 5 in a 9×9 cross connect) of the other side in the quiescent state. The beam steerers steer approximately 1 port per 125 mA applied with forward injection into a triangle, and approximately 1 port/50V with reverse voltage into a triangle; i.e., the coarse stage steers by one waveguide or the fine stage steers by one port. Using reverse bias to steer is preferred because it entails virtually zero power dissipation and is fast. However, because reverse bias steering requires voltages greater than the break-down voltage, forward injection current is used. To achieve good steering, the injected current should preferably be uniform over the phase shifters. In the exemplary embodiment, which uses triangles, the injected current is uniform over the phase shifter triangles. The etching of the sacrificial layer before metal deposition aids in achieving such uniformity.

The waveguide structure of the exemplary device can be implemented as a buried rib-loaded slab, and its cross section is essentially the same as that described in C. R. Doerr et al., "Wavelength-division multiplexing cross connect in InP," IEEE Photon. Technol. Lett., vol. 10, pp. 117–119, 1998. An exemplary method for fabricating such a device requires only two mask plates and begins with the step of growing the base wafer containing the graded-index slab and rib. The waveguides are then patterned and wet-etched through the rib. Approximately 0.6 $\mu$m of non-intentionally doped InP is then regrown over the entire wafer. Then, $SiO_2$ is deposited over the wafer and triangular openings over the beam steerer waveguide arrays are etched through the $SiO_2$. p-doped InP is then grown on the wafer, finishing with a quaternary cap and a 15-nm InP layer. Using the same mask plate as for the $SiO_2$ patterning, photoresist is patterned and gold-zinc is deposited on top. However, before the metal deposition but after the photoresist patterning, the top thin InP layer is etched off, providing a pristine surface for the metals. Finally, the wafer backside is coated with gold.

An analysis of a cross connect with non-cascaded beam steerers, as shown in FIG. 1, will now be described. The transmissivity through a $N_L \times N_R$ cross connect from the outer port of beam steerer $n_L$ on the left side, which is pointed at beam steerer $P_L$ on the right side, and from the outer port of beam steerer $n_R$ on the right side, which is pointed at beam steerer $P_R$ on the left side, is $$t_{n_L,n_R}(p_L, p_R) = \sum_{m_L,m_R=1}^{M_L,M_R} a_L\left[0,\left(m_L - \frac{M_L+1}{2}\right)\frac{\Delta\alpha_L}{M_L}\right] \quad (1)$$

$$a_c\left\{\left[m_L - \frac{M_L+1}{2} + M_L\left(n_L - \frac{N_L+1}{2}\right)\right]\frac{2\pi}{M_L N_L k s_R}, \left[m_R - \frac{M_R+1}{2} + M_R\left(n_R - \frac{N_R+1}{2}\right)\right]2\frac{\pi}{M_L N_L k s_L}\right\}$$

$$a_R\left[\left(m_R - \frac{M_R+1}{2}\right)\frac{\Delta\alpha_R}{M_R}, 0\right]\exp\left[j\left(p_L - \frac{N_R+1}{2}\right)\frac{2\pi}{N_R}m_L\right]$$

$$\exp\left[j\left(p_R - \frac{N_L+1}{2}\right)\frac{2\pi}{N_L}m_R\right]$$

where a is the amplitude transmissivity through a star coupler, and is given by $$a_i(\alpha_1, \alpha_2) \approx \quad (2)$$

$$\exp(-jkR_i\alpha_1\alpha_2)\frac{\left|\int_{-\infty}^{\infty} u_{i,2}(x)\exp(jkx\alpha_1)dx \int_{-\infty}^{\infty} u_{i,1}(x)\exp(jkx\alpha_2)dx\right|}{\sqrt{\frac{2\pi R_i}{k}\int_{-\infty}^{\infty}|u_{i,1}(x)|^2 dx \int_{-\infty}^{\infty}|u_{i,2}(x)|^2 dx}}$$

$R_i$ are the radii, $R_L$ and $R_R$, of the star couplers 14 on the left and right sides, respectively, of the cross connect. $R_L$ is given by:

$$R_L = r_L M_L/\Delta\alpha_L.$$

The expression for $R_R$ is analogous. The radius of the central star coupler 12 is given by:

$$R_C = kM_L N_L s_L s_R/(2\pi).$$

r and s are the center-to-center spacing of the waveguide arrays at the outer star couplers 14 and central star coupler 12, respectively, and $\Delta\alpha$ is the chosen capture angle of the waveguides from the input and output ports. k is the propagation constant in the star couplers, and u(x) is the orthogonalized mode amplitude across the waveguide at the star-coupler/waveguide junction. Moreover, in general:

$$M_L N_L = M_R N_R.$$

The symmetric case, i.e., in which all left- and right-side parameters are equal, will be calculated for an exemplary, non-cascaded beam steerer embodiment of a cross connect with N=9, M=13, and $\Delta\alpha$ such that the power in the outermost waveguides is approximately −7 dB of the power in the center waveguides in each beam steerer. InP is selected as the material with waveguide Δn/n=0.0086. s=8.0 μm with gaps of 0.8 μm between the waveguides.

There are $9^{18} \approx 1.5 \times 10^{17}$ combinations of beam steerers steering at each other. 9!=362,880 of these combinations are generally useful, consisting of left-right pairs of beam steerers pointing at each other. Plots of $|t_{5,n_R}(p_L,5)|^2$ vs. $p_L$ and $|t_{5,n_R}(5,p_R)|^2$ vs. $p_R$ are shown in FIGS. 4A and 4B, respectively.

Figure 4A:
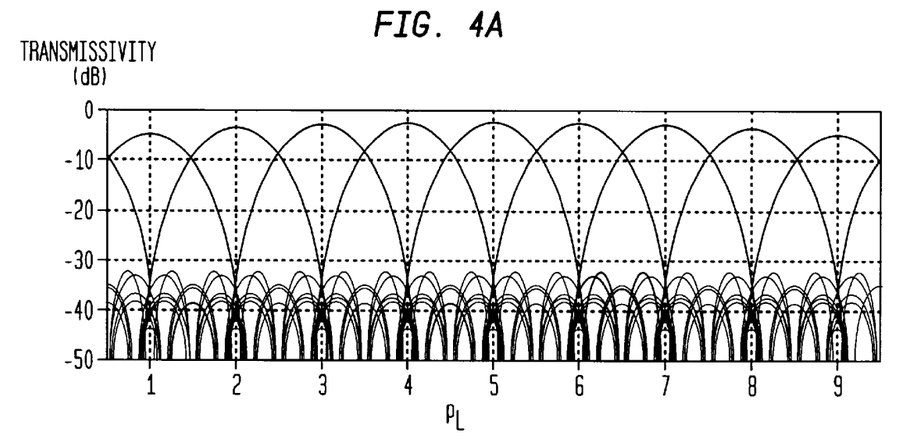
FIGS. 4A and 4B are plots of the transmissivities through a 9×9 cross connect with single-stage beam steerers.

FIG. 4A shows the transmissivity from the center left beam steerer to each of the nine beam steerers on the right when the right beam steerers are all pointed at the center left beam steerer as it steers through its range. FIG. 4B shows the transmissivity with the left center beam steerer pointed at the right center beam steerer, while the right beam steerers steer through their ranges. FIG. 4B shows the transmissivity for varying $n_R$. The values of $n_R$ are labeled in FIG. 4B.

Figure 4B:
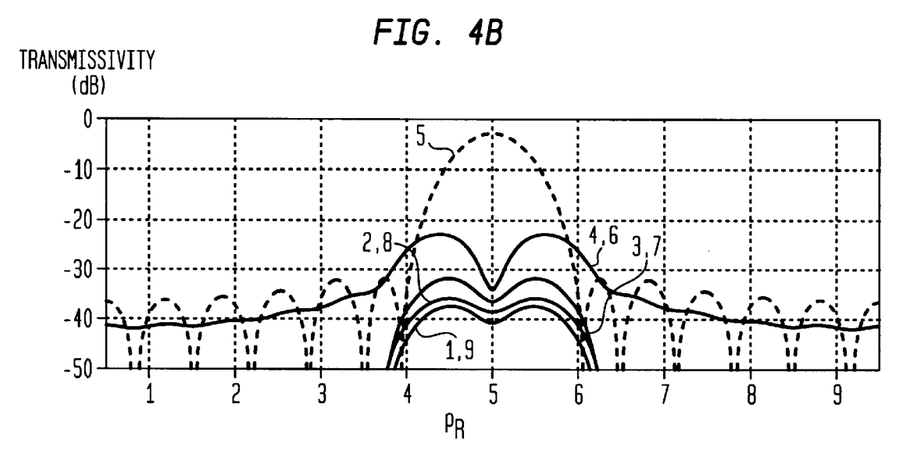

From FIG. 4B, one can see the contributions to crosstalk. The worst-case crosstalk contribution to a connection, approximately −24 dB, occurs when a nearest neighbor beam steerer on one side is pointing to a nearest neighbor beam steerer on the other side. The crosstalk is substantially smaller for all other possibilities. The crosstalk can be reduced by increasing the ratio M/N.

Such an exemplary embodiment of a cross connect can be difficult to build because it requires phase shifters that can deliver approximately 11π of phase shift. Cascaded beam steerers in accordance with the present invention can advantageously be used for such a configuration.

An exemplary embodiment of a cross connect with two-stage cascaded beam steerers, similar to those shown in FIG. 2, will now be analyzed, with the first stage having $N_1=3$, $M_1=5$, and the second stage having $N_2=3$, $M_2=13$. In such an embodiment, the required phase shift across the waveguide array is only 8π/3 in the first stage and 8π/3 in the second stage. Such a beam steerer is shown in FIGS. 3A and 3B.

Figure 5A:
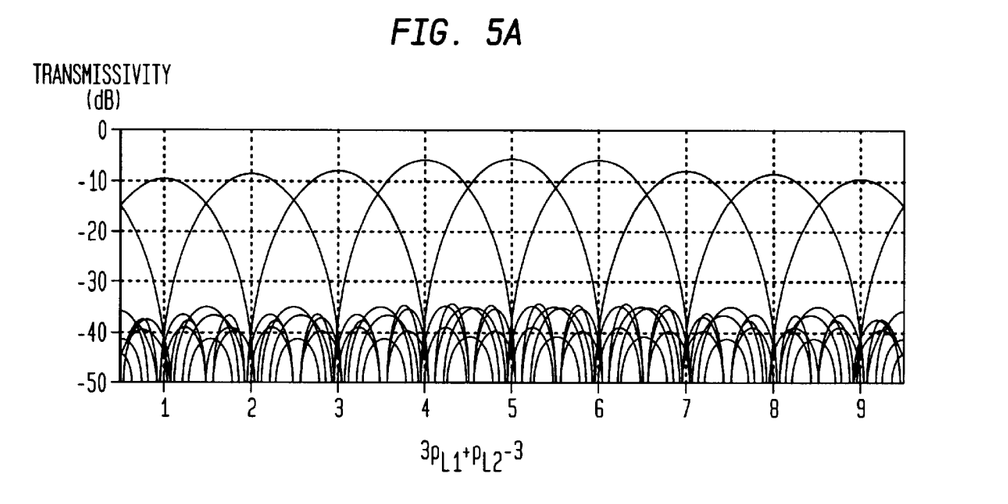
FIGS. 5A and 5B are plots of the transmissivities through a 9×9 cross connect with two-stage beam steerers.
Figure 5B:
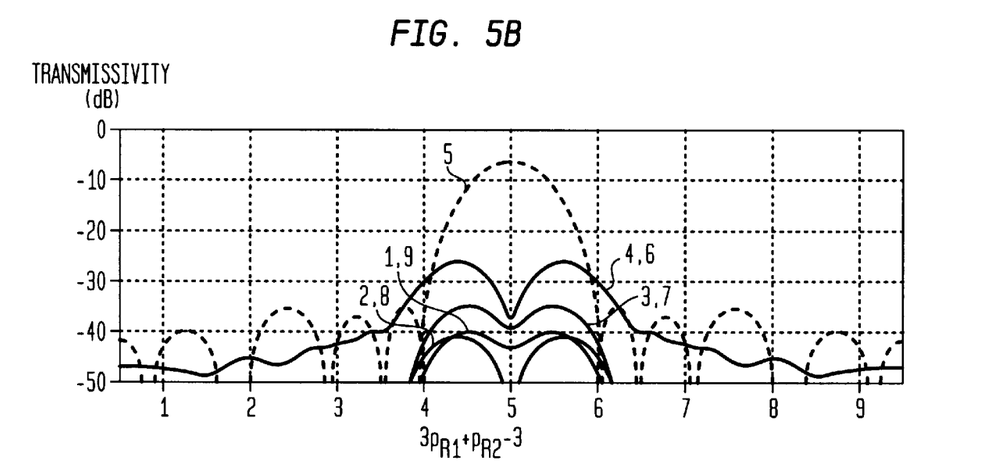

The transmissivity of such a cross connect can be designated:

$$t_{n_L,n_R}^{(2)}(p_{L1},p_{L2},p_{R1},p_{R2}),$$

where the p run from 1 to 3. $P_1$ denotes the connecting waveguide 130 to which the first beam steerer points and $P_2$ denotes one of the three positions to which the second stage can deflect. Based on a modified Eq. 1, FIG. 5A shows a plot of $|t_{5,n_R}^{(2)}(p_{L1}, p_{L2},2,2)|^2$ vs. $3p_{L1}+p_{L2}-3$ and FIG. 5B shows a plot of $|t_{5,n_R}^{(2)}(2,2,p_{R1},p_{R2})|^2$ vs. $3p_{R1}+p_{R2}-3$, with varying $n_R$. The values of $n_R$ are labeled in FIG. 5B. The plots of FIGS. 5A and 5B are analogous to those of FIGS. 4A and 4B, respectively.

For the plots of FIGS. 5A and 5B, the phase difference between the three connecting waveguides between the two stages is zero. Using finite phase differences changes the fine structure of the ripples in the plots, but leaves the overall crosstalk levels effectively unchanged. Although the loss is higher for the two-staged steerer case, the crosstalk is substantially the same as the single-stage case. For larger N, the insertion loss should remain the same except that the addition of each cascaded stage adds approximately 2.5 dB to the loss.

Figure 6:
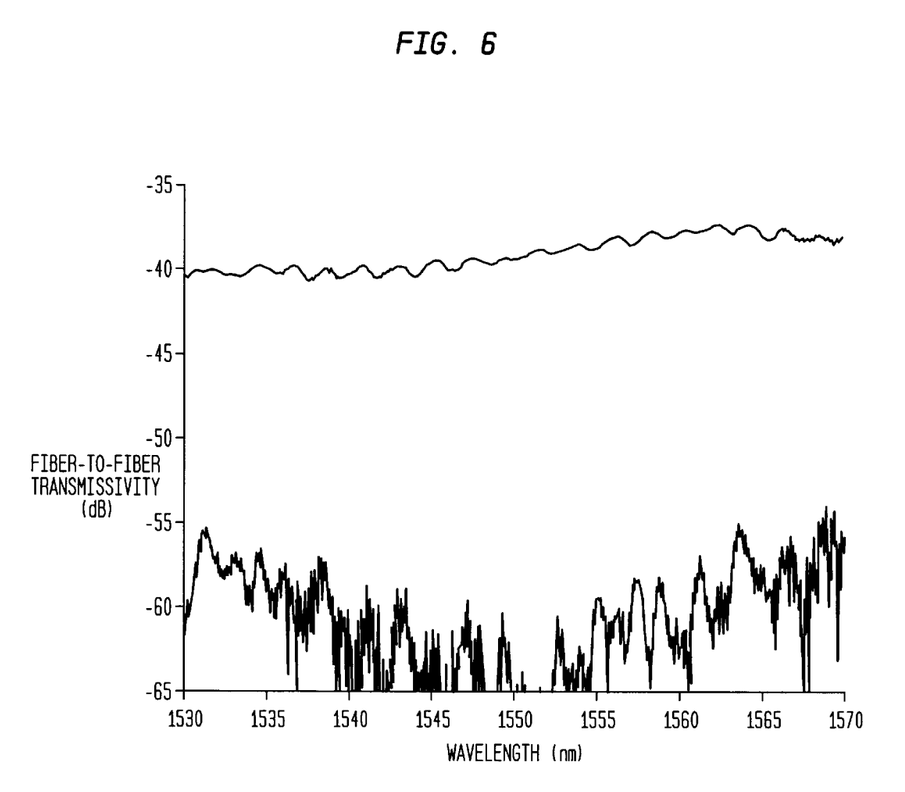
FIG. 6 shows transmissivities measured for an exemplary cross connect constructed in accordance with the present invention.

FIG. 6 shows the measured switching performance and wavelength sensitivity of an exemplary 9×9 cross connect constructed in accordance with the present invention. In obtaining the results shown, spontaneous emission from an Er-doped fiber amplifier was sent through port 4 on the left side and measured from port 6 on the other side, via lensed fibers. The bottom trace shows the transmissivity measured when no currents are applied, in which case all ports are aimed at port 5. The top trace shows the transmissivity when approximately 125 mA is applied to the downward-steering triangle of the fine steerer of the left-hand port 4 and approximately 125 mA is applied to the upward-steering triangle of the fine steerer of the right-hand port 6; i.e., ports 4 and 6 are steered at each other. As can be seen, the switching extinction ratio is 15–25 dB, with the highest extinction occurring at approximately 1551 nm. This is near the wavelength (1555 nm) for which the star couplers are designed. Note that this is the worst-case extinction ratio, which occurs when one port is steered towards a neighboring port (port 5 here) of the other port.

FIGS. 7A–7E show the measured switching performance for several different steering configurations of the exemplary 9×9 cross connect. Light from a laser at 1555 nm was launched into a port on the left-hand side, starting from port 1 and proceeding to port 5, and the amount exiting each of the nine ports on the right-hand side was measured, using a bandpass filter to filter out any 1.3-μm spontaneous emission generated by the phase shifters. For each port combination, the beam steerers were steered to make a connection. After making a connection, the optical powers appearing at the other eight ports on the right-hand side, to which no currents were applied, were measured. An exception is when the left-hand launch port was number 5, in which case the other ports were steered to a neighboring port (by applying current to one of the fine-steerer triangles of the measured right-hand port).

Figure 7A:
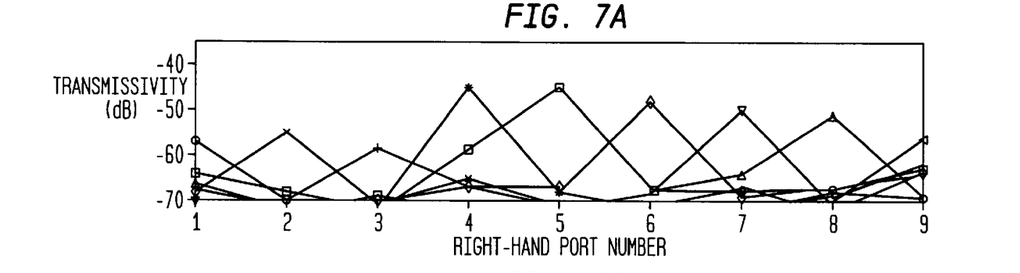
FIGS. 7A through 7E show transmissivities measured for various steering configurations between ports of an exemplary cross connect constructed in accordance with the present invention.
Figure 7B:
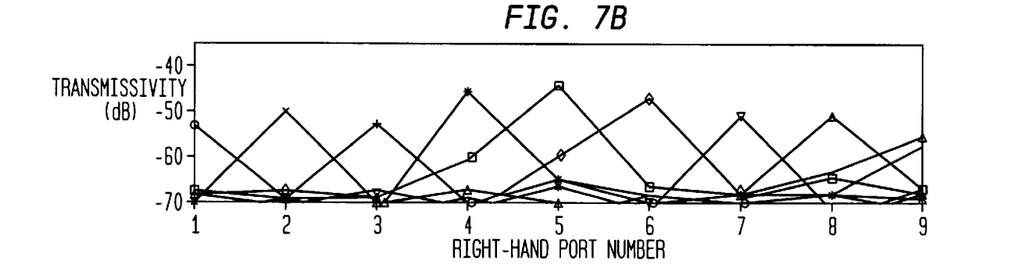
Figure 7C:
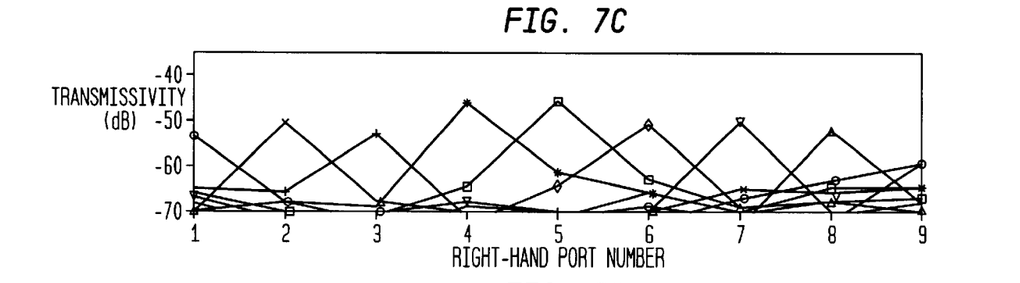
Figure 7D:
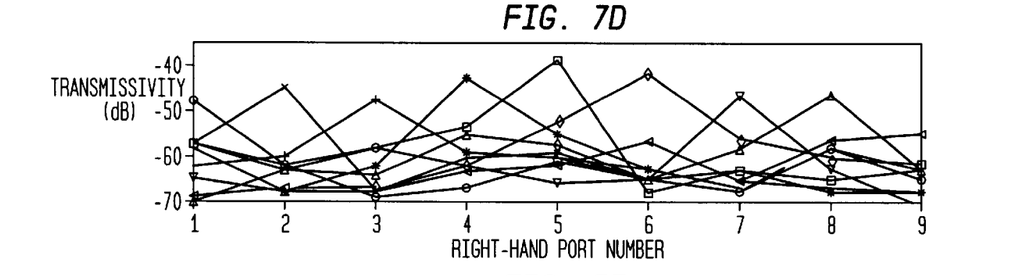
Figure 7E:
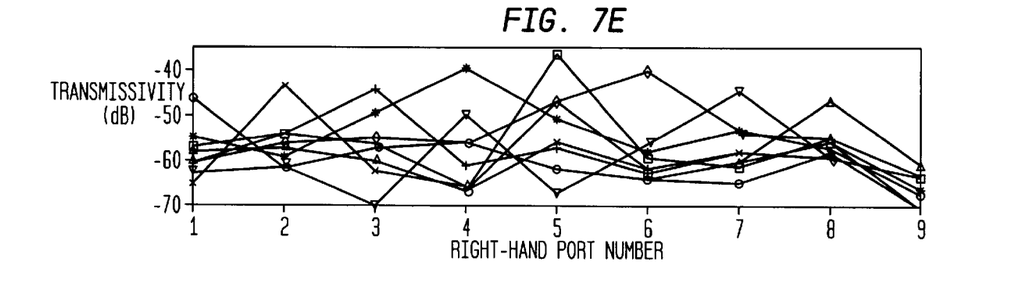

In the performing the measurements shown in FIG. 7A, light was launched into left-hand port 1 and measured at right-hand port 1. The coarse and fine steerers of ports 1 on both sides were adjusted to maximize the transmitted optical power. In this condition, the optical power exiting right-hand ports 2 through 9 was also measured, without applying any steering signals to these right-hand ports. The results thus measured are represented in FIG. 7A by circles.

A similar procedure was then performed for left-hand port 1 and right-hand port 2. The procedure is the same for FIGS. 7A–7D, but in FIG. 7E, when measuring the non-steered-to ports, their fine steerer stages were driven in order to steer them away from left-hand port 5. Note that the extinction ratio degrades for the worst case of beam steerers pointing at one of the other's nearest neighbors, the case in FIGS. 7D and 7E. The crosstalk values shown range from approximately −5 to −25 dB.

The loss for TM-polarized light was approximately 4.4 dB more than for TE-polarized light, and the steering angle was also slightly polarization-dependent. Insertion loss can be reduced by reducing the spacing between the waveguide connections to the central star coupler.

As can be seen in FIG. 3B, most of the length of a cross connect device with cascaded beam steerers in accordance with the present invention is taken up by the central star coupler 12, whose length increases quadratically with N. With much larger values of N, the device becomes too long to fit on a conventional wafer. For instance, a 64×64 cross connect implemented in silica would have a free-space length of several meters (but a width of only a few centimeters). Such a free-space length, however, can be achieved in bulk optics using a configuration such as shown in FIG. 8.

Figure 8:
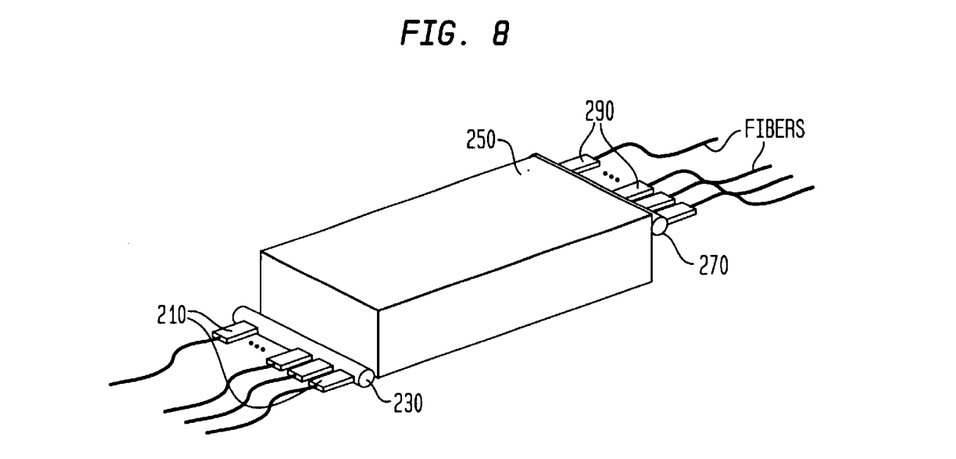
FIG. 8 shows an exemplary embodiment of a modular optical cross connect in accordance with the present invention.

FIG. 8 shows an exemplary embodiment of a modular optical cross connect using planar lightwave circuit beam steerers 210, 290 in accordance with the present invention. The beams from the beam steerers 210 on the left side of the cross connect are collimated in the vertical direction by a cylindrical lens 230, enter a "tilted" glass block 250, undergo multiple reflections in a zig-zag fashion, and are focused into planar beam steerers 290 on the right side. Like the left-side beam steerers 210, the beam steerers 290 on the right side are coupled to the block 250 by a cylindrical lens 270. The left and right end surfaces of the glass block 250 are high-reflection (HR) coated except for narrow windows where the beams enter and exit the block.

In the exemplary embodiment of FIG. 8, the glass block is tilted; i.e., it has a rhomboid cross-section as seen from the side, with the lenses 230 and 270 coupled to the acutely angled edges of the block. The degree to which the block is tilted determines how many times a light beam will zig-zag though the block and thus the effective length of the optical free space provided by the block.

In an exemplary embodiment of a 64×64 cross connect implemented in silica with four bounces inside the glass block 250, the size of the block is approximately 15 cm wide×50 cm long×1 cm high. Furthermore, due to the large optical free-space length provided by the block 250, the end faces of the block 250 can be flat as opposed to being arched. Nonetheless, the end faces can be arched, thereby allowing a reduction of the required free-space length and thus of the size of the block 250.

Figure 9:
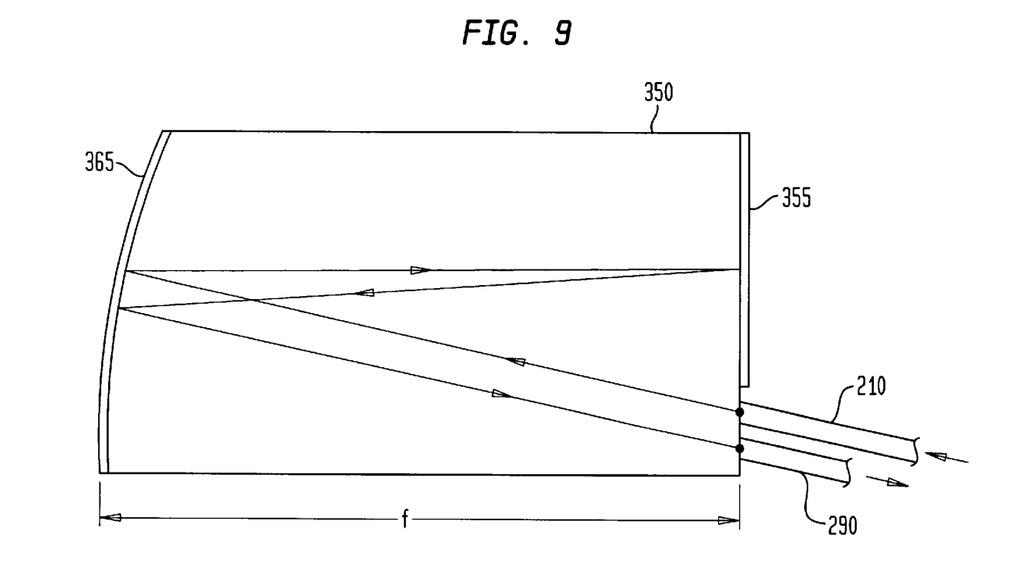
FIG. 9 shows a further exemplary embodiment of a modular optical cross connect in accordance with the present invention.

FIG. 9 shows a side view of another exemplary embodiment of a modular beam steering cross connect. In this embodiment, the beam steerers 210, 290 are arranged along an edge of a glass block 350 which has one flat reflective surface 355 and an arched reflective surface 365, as shown. The arched surface 365 acts as a cylindrical reflector with a focal length f which is half the radius of curvature of the arched surface. A beam emitted from a beam steerer 210 is reflected by the arched surface 365 to the flat surface 355. The flat surface 355 reflects the beam back to the arched surface 365 which reflects it to a receiving beam steerer 290. Naturally, the direction of the beam is reversed for signals directed from the beam steerer 290 to the beam steerer 210.

What is claimed is:

1. An optical cross connect comprising:
   a free space region, the free space region including a left edge and a right edge;
   a plurality of planar beam steerers arranged along the left edge of the free space region; and
   a plurality of planar beam steerers arranged along the right edge of the free space region, wherein:
   each beam steerer arranged along the left edge of the free space region can selectively direct a light beam to a beam steerer arranged along the right edge of the free space region,
   each beam steerer arranged along the left edge of the free space region can selectively receive a light beam from a beam steerer arranged along the right edge of the free space region,
   each beam steerer arranged along the right edge of the free space region can selectively direct a light beam to a beam steerer arranged along the left edge of the free space region,
   each beam steerer arranged along the right edge of the free space region can selectively receive a light beam from a beam steerer arranged along the left edge of the free space region, and
   each beam steerer includes a refraction type phase shifter that alters the refraction index of waveguides to refract the light beams traveling through the waveguides.

2. An optical cross connect in accordance with claim 1, wherein each beam steerer further comprises:
   a star coupler; and
   an array of waveguides, the array of waveguides including a plurality of waveguides coupled at a first end to the star coupler and at a second end to the free space region;
   wherein the refraction type phase shifter is arranged proximate to the array of waveguides and controls a phase shift in the waveguides in response to a control signal applied to the refraction type phase shifter.

3. An optical cross connect in accordance with claim 1, wherein the free space region is planar.

4. An optical cross connect in accordance with claim 1, wherein:
   the free space region includes a transparent block, the transparent block having a left end surface and a right end surface,
   the left and right end surfaces are reflective,
   the left end surface includes the left edge of the free space region,
   the right end surface includes the right edge of the free space region, and
   the left and right end surfaces are substantially parallel.

5. An optical beam steerer comprising:
   a first star coupler;
   a second star coupler;
   a first array of waveguides, the first array of waveguides including a plurality of waveguides coupled at a first end to the first star coupler and at a second end to the second star coupler;
   a first phase shifter, the first phase shifter being arranged proximate to the first array of waveguides and controlling a phase shift in the first array of waveguides;
   a third star coupler;
   a plurality of connecting waveguides, the connecting waveguides being coupled at a first end to the second star coupler and at a second end to the third star coupler;
   a second array of waveguides, the second array of waveguides including a plurality of waveguides coupled at one end to the third star coupler; and
   a second phase shifter, the second phase shifter being arranged proximate to the second array of waveguides and controlling a phase shift in the second array of waveguides.

6. A beam steerer in accordance with claim 5, wherein the waveguides in the first array of waveguides have substantially the same length and wherein the waveguides in the second array of waveguides have substantially the same length.

7. A beam steerer in accordance with claim 5, wherein each of the first and second phase shifters includes a first triangular phase shifter and a second triangular phase shifter, the first triangular phase shifter controlling a phase shift in one direction and the second triangular phase shifter controlling a phase shift in an opposite direction.

8. An optical cross connect comprising:
   a free space region, the free space region including a left edge and a right edge;
   a plurality of planar beam steerers arranged along the left edge of the free space region; and
   a plurality of planar beam steerers arranged along the right edge of the free space region, wherein:
   each beam steerer arranged along the left edge of the free space region can selectively direct a light beam to a beam steerer arranged along the right edge of the free space region, each beam steerer arranged along the left edge of the free space region can selectively receive a light beam from a beam steerer arranged along the right edge of the free space region, each beam steerer arranged along the right edge of the free space region can selectively direct a light beam to a beam steerer arranged along the left edge of the free space region, and each beam steerer arranged along the right edge of the free space region can selectively receive a light beam from a beam steerer arranged along the left edge of the free space region; and wherein each beam steerer comprises:

a star coupler;

an array of waveguides, the array of waveguides including a plurality of waveguides coupled at a first end to the star coupler and at a second end to the free space region; and a phase shifter, the phase shifter being arranged proximate to the array of waveguides and controlling a phase shift in the waveguides in response to a control signal applied to the phase shifter.

* * * * *